Aug. 25, 1925.

R. TRÖGER 1,551,346

PROTECTIVE SYSTEM

Filed Nov. 4, 1924

Inventor:
Richard Tröger,
by Alexander S. Lunt
His Attorney.

Patented Aug. 25, 1925.

1,551,346

UNITED STATES PATENT OFFICE.

RICHARD TRÖGER, OF ZEHLENDORF, GERMANY, ASSIGNOR TO GENERAL ELECTRIC COMPANY, A CORPORATION OF NEW YORK.

PROTECTIVE SYSTEM.

Application filed November 4, 1924. Serial No. 747,876.

*To all whom it may concern:*

Be it known that I, RICHARD TRÖGER, a citizen of Germany, residing at Zehlendorf, Germany, have invented certain new and useful Improvements in Protective Systems, of which the following is a specification.

My invention relates to protective systems, and has for its object the provision of an improved arrangement for precluding the flow of excessive current between interconnected electric machines or sources which are subject to different electrical conditions.

In many cases the interconnection of electrical machines or sources subject to different electrical conditions is apt to produce excessive and injurious currents. It is well known that in the paralleling of alternating current generators for example, such currents are likely to be produced unless the different generators are in phase and are operating at substantially the same frequency and voltage. Likewise, the connection of an electric motor to a source of current is immediately followed by a rush of current due to the low value of the motor counter-electromotive force at starting. In these and other cases where excessive currents are apt to be produced, it has been customary to provide protective apparatus designed to isolate the endangered apparatus. This procedure is not always satisfactory for the reason that it is frequently desirable to retain the connection between the different apparatus until a stable operating condition has been attained. In accordance with my invention, the different apparatus are initially or permanently interconnected through a series resonant circuit which is selectively adjustable to both frequency and current through automatic variation of one component of the reactance in accordance with the magnitude of the current, as by the use of a reactor having an iron core for example.

My invention will be better understood from the following description when considered in connection with the accompanying drawing and its scope will be pointed out in the appended claims.

Figure 1:
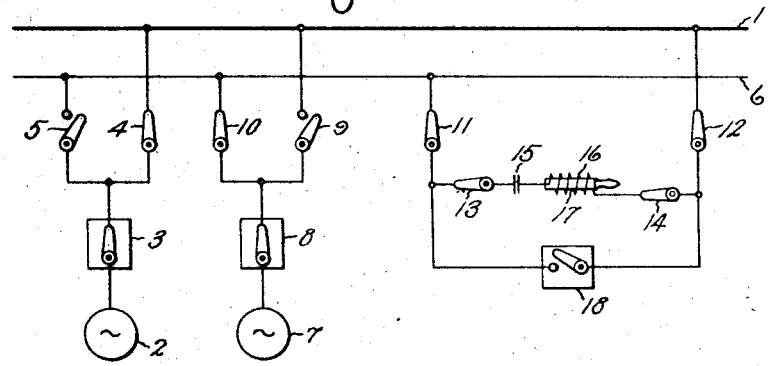
Figure 2:
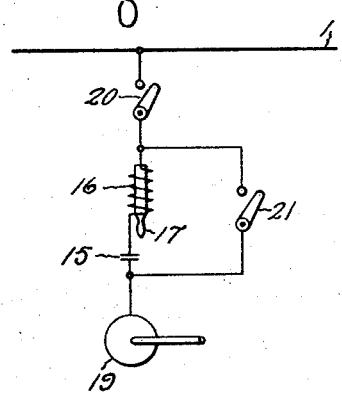
Figure 3:
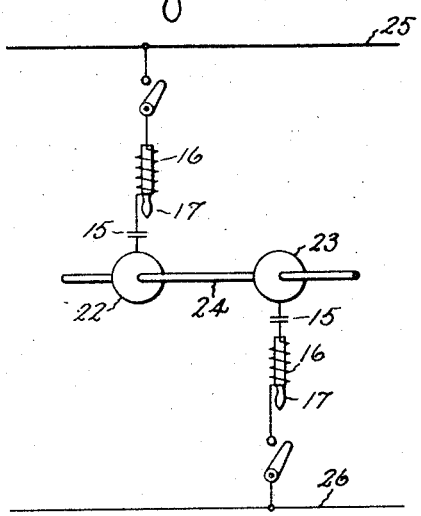

Referring to the drawings, Fig. 1 shows my invention as utilized in the paralleling of two electric machines or sources; Fig. 2 shows it as applied to the starting of an electric motor, and Fig. 3 shows it as used to limit the interchange of current between two different electric systems. For the purpose of simplifying the drawing, single lines have been used to designate electric power mains and buses which may consist of one or more phases.

Fig. 1 shows an alternating current main bus 1, to which current may be supplied from a generator 2 through oil switch 3 and disconnect switch 4, or from a generator 7 through oil switch 8 and disconnect switch 9. Disconnect switches 5 and 10 are provided for connecting the generators 2 and 7 respectively to the auxiliary bus 6. The main bus 1 may be interconnected with a power transmission or distribution system which is supplied with current from a plurality of sources not shown. For the purpose of paralleling the various generators arranged to be interconnected with the main bus 1, a tuned circuit is provided. This circuit is arranged to be connected between the buses 1 and 6 by means of switches 11, 12, 13 and 14, and comprises a condenser 15 and a reactor 16 provided with an iron core 17. Where it is desired to exclude the tuned circuit from the generator circuit after the generator has been synchronized, a switch 18 connected between the terminals of the circuit may be provided.

It is well known that the inductance of a reactor having an iron core changes due to the fact that the permeability of the core varies with the degree of its saturation. Thus, when the core is operating at a low degree of saturation, the inductance of the reactor is comparatively high and when the core is saturated, the inductance of the reactor is comparatively low. Up to the point of saturation, therefore, the inductance of the reactor is determined by the magnitude of the current which it carries. If such a reactor be connected in series with a condenser and supplied with current at a constant frequency, the maximum value of current will be transmitted through the circuit when the reactance of the condenser and that of the reactor are equal. Under these conditions, the circuit operates as if it contained only resistance and a condition of resonance is said to exist. Upon closure of the circuit comprising condenser 15 and reactor 16 therefor, there will be a tendency for the current supplied through this circuit to increase in value, thereby reducing the reactance of the reactor 16 until it is substantially equal to that of the condenser 15. When this occurs, any further changes in the current value will increase or decrease the reactance of the reactor 16, thus changing the tuning of the circuit and immediately bringing into operation a force tending to maintain the current at a value predetermined by the frequency at which current is supplied and the characteristics of the condenser and reactor.

Assuming the switches to be in their illustrated positions, the circuit comprising condenser 15 and reactor 16 to be tuned for the frequency at which the bus 1 is operating and the generator 7 to be excited, the current supplied to the generator 7 will immediately increase to a value predetermined by the characteristics of the circuit comprising condenser 15 and reactor 16. When the speed of the generator 7 is increased, it will tend to supply current of variable frequency to the bus 1, but so long as its frequency is substantially different from that of the generator 2 and the main bus 1, this current will be limited to a low value by the impedance of the tuned circuit. As the frequency of the generator 7 more nearly approaches that of the bus, the synchronizing force exerted between the generator and the bus increases until the generator assumes the same phase and frequency as that of the bus. Under these conditions, the value of the current transmitted between the generator and bus is free to assume a value predetermined by the characteristics of the tuned circuit and a condition of complete synchronism may be established by varying the excitation of the generator 7 until its voltage becomes equal to that of the bus. When a condition of synchronism has been established, the switch 18 may be closed to short-circuit the tuned circuit, the switch 9 may be closed to connect the generator 7 directly to the bus 1, and the switch 10 may be opened to release the auxiliary bus and tuned circuit for use in paralleling other generators with the system.

As will be readily understood, my invention is not limited to the paralleling of generators but is capable of many different uses. In the case of a small power station controlled from a distance, a generator may be accelerated and synchronized by connecting it to the line through the tuned circuit and starting its prime mover. If the tuned circuit is designed for the full load current of the generator, it may be permanently retained in the circuit, thus serving to limit the load supplied from station and to limit the current transmitted between the system and station under all conditions of operation.

Fig. 2 shows a motor 19 arranged to be supplied with current from the bus 1 through a switch 20 and a tuned circuit comprising condenser 15 and reactor 16. A switch 21 is provided for short-circuiting the tuned circuit when it is desired to utilize it only during starting. In view of what has been said, it will be readily understood that the starting current of the motor 19 is predetermined by the characteristics of the tuned circuit. If desired, the tuned circuit may be designed for the full load current of the motor and utilized during operation of the motor as a protective device.

Fig. 3 shows a pair of machines 22 and 23 mounted on a common shaft 24 and arranged to interchange power between two electric systems 25 and 26 in a manner well understood by those skilled in the art. It is well known that variations in the frequencies of the systems 25 and 26 are apt to overload the machines by which these systems are interconnected. In order to protect the machines 22 and 23 against overload, tuned circuits similar to that previously described are interposed between them and the lines to which they are connected. While I have shown each machine as protected by a tuned circuit, it will be apparent that one tuned circuit will in most cases afford adequate protection for both machines.

As will be apparent to those skilled in the art, my invention is capable of a variety of applications and permits of many modifications. I therefore aim in the appended claims to cover all arrangements and modifications which fall within the true spirit and scope of my invention.

What I claim as new and desire to secure by Letters Patent of the United States, is,—

1. A protective system for precluding the interchange of excessive current between alternating current circuits required to be interconnected when subject to different electrical conditions, comprising a circuit arranged to be tuned at a predetermined frequency and a predetermined current, and means for connecting said circuit between said alternating current circuits.

2. A protective system for precluding the interchange of excessive current between alternating current machines required to be interconnected when subject to different electrical conditions, comprising a circuit arranged to have its tuning varied in accordance with the transmission of current therethrough and to be resonant at a predetermined frequency with a predetermined current, and means for connecting said circuit between said machines.

3. A protective system for precluding the interchange of excessive current between alternating current machines required to be interconnected when subject to different electrical conditions, comprising a circuit including a condenser and a reactor provided with an iron core adapted to become saturated at a predetermined current, and means for connecting said circuit between said machines.

In witness whereof, I have hereunto set my hand this 17th day of October, 1924.

RICHARD TRÖGER.